US010323720B2

(12) United States Patent
Rekow et al.

(10) Patent No.: US 10,323,720 B2
(45) Date of Patent: Jun. 18, 2019

(54) HYDRAULIC SYNCHRONIZER

(71) Applicant: Deere & Company, Moline, IL (US)

(72) Inventors: Andrew K. Rekow, Cedar Falls, IA (US); Matthew B. Winhold, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 268 days.

(21) Appl. No.: 15/187,636

(22) Filed: Jun. 20, 2016

(65) Prior Publication Data

US 2017/0363178 A1   Dec. 21, 2017

(51) Int. Cl.
| F16D 23/06 | (2006.01) |
| F16D 11/14 | (2006.01) |
| F16H 3/12  | (2006.01) |
| F16D 23/02 | (2006.01) |

(52) U.S. Cl.
CPC .............. *F16H 3/12* (2013.01); *F16D 23/02* (2013.01); *B60Y 2200/221* (2013.01)

(58) Field of Classification Search
CPC .......................... F16D 2023/0631; F16D 11/14
USPC ........................................................ 74/339
See application file for complete search history.

(56) References Cited

U.S. PATENT DOCUMENTS

| 2,323,592 A | 7/1943 | Gunberg |
| 4,131,185 A * | 12/1978 | Schall ...................... F16D 23/04 192/48.614 |
| 4,855,914 A | 8/1989 | Davis et al. |
| 5,135,087 A | 8/1992 | Frost |
| 5,161,423 A | 11/1992 | Ore |
| 5,377,800 A * | 1/1995 | Sperduti ................. F16D 23/04 192/53.3 |
| 5,667,052 A | 9/1997 | Richardson |
| 6,006,149 A | 12/1999 | Salecker et al. |
| 6,588,562 B2 * | 7/2003 | Fernandez .............. F16D 23/06 192/53.31 |
| 7,155,993 B2 | 1/2007 | Koenig et al. |

(Continued)

FOREIGN PATENT DOCUMENTS

| DE | 102007009462 A1 | 8/2008 |
| EP | 0836025 A1 | 4/1998 |

OTHER PUBLICATIONS

German Patent and Trademark Office, Search Report in German Patent Application No. 10 2017 207 136.2 dated Dec. 8, 2017.

*Primary Examiner* — Ha Dinh Ho
(74) *Attorney, Agent, or Firm* — Klintworth & Rozenblat IP LLP

(57) ABSTRACT

A hydraulic synchronizer selectively couples one or more gears to a drive shaft. The synchronizer has a shaft hub with a splined annulus and a fluid passage. A ring is disposed about the shaft hub and movable along a rotation axis of the shaft hub. A shift collar is fixedly coupled to the ring and has a splined annulus engaged with the splined annulus of the shaft hub. The shift collar is configured to engage splines of a gear when the ring is in an engaged axial position and to disengage the splines of the gear when the ring is in a neutral position. The shift collar transmits rotational input from the shaft hub to the gear when the ring is in the engaged axial position. Hydraulic chambers receive hydraulic fluid from the fluid passage and move the ring to the engaged and neutral positions.

20 Claims, 11 Drawing Sheets

(56) References Cited

U.S. PATENT DOCUMENTS

| | | | |
|---|---|---|---|
| 7,559,415 B2* | 7/2009 | Braford, Jr. ............ | F16D 23/06 |
| | | | 192/53.32 |
| 8,117,935 B2 | 2/2012 | Diemer et al. | |
| 8,733,521 B2 | 5/2014 | Moorman et al. | |
| 8,845,491 B2 | 9/2014 | Li et al. | |
| 2006/0049018 A1* | 3/2006 | Legner .................. | F16D 23/06 |
| | | | 192/53.34 |
| 2006/0101933 A1 | 5/2006 | Koenig et al. | |
| 2010/0162849 A1 | 7/2010 | Love et al. | |
| 2012/0138413 A1 | 6/2012 | Moorman et al. | |

\* cited by examiner

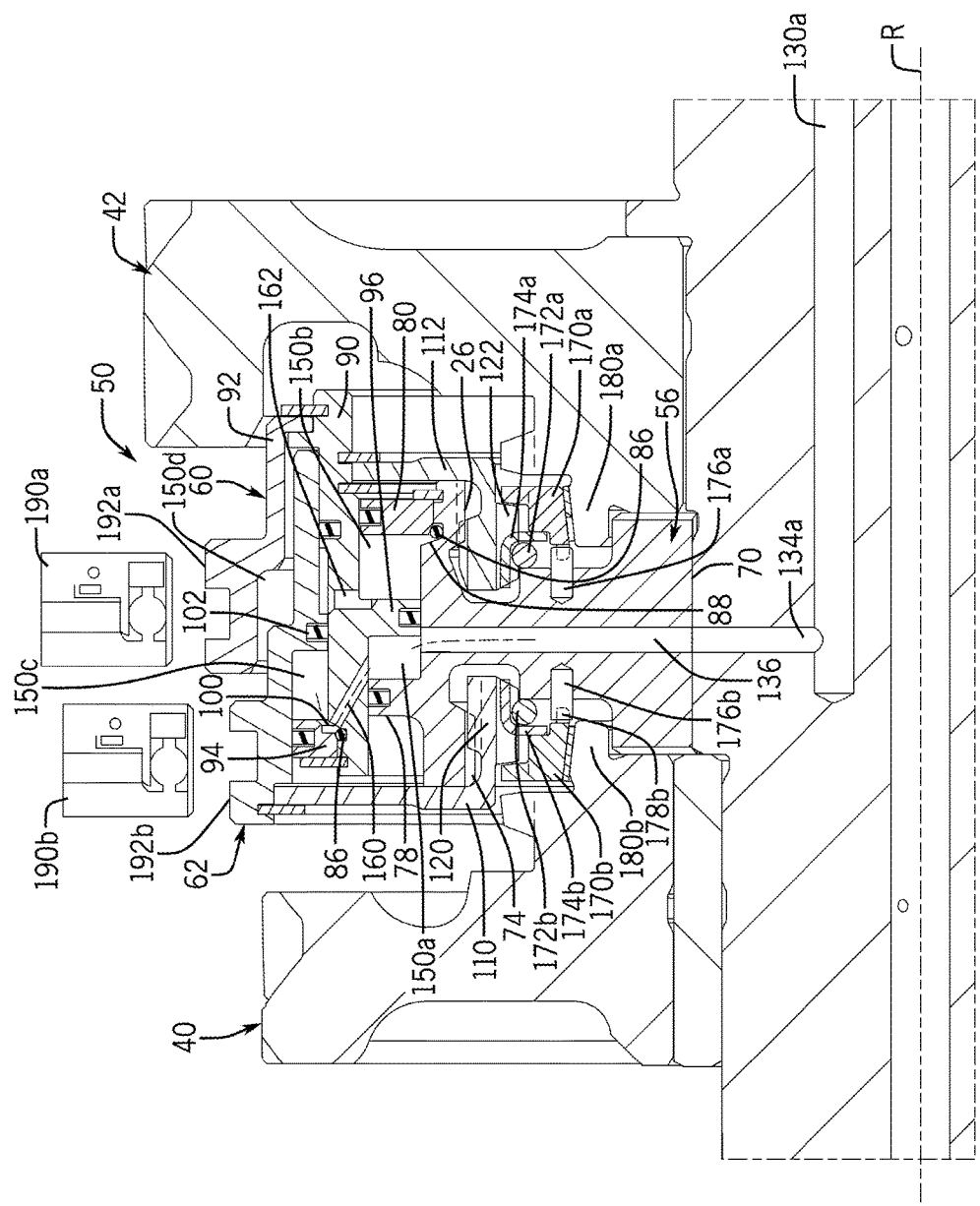

HYDRAULIC SYNCHRONIZER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to synchronizer arrangements for meshing a drive input with one or more gears of a transmission, and particularly to hydraulic synchronizers for work vehicles.

BACKGROUND OF THE DISCLOSURE

Various transmission assemblies, such as those used in the drivetrains of various work vehicles, may include transmissions that incorporate "synchronizers" that facilitate the selective coupling of a rotating drive shaft (e.g., powered by an engine or drive motor) with one or more range gears. Often, the synchronizers are actuated by a shift fork that rides along a shift rail to move a shift collar splined to the drive shaft into meshing engagement with a gear to transmit rotational power from the drive shaft to the gear, and thereby initiate or effect a change in range speed and torque to the wheels or tracks of the work vehicle. Reversing actuation of the shift fork disengages the shift collar from the gear, and thus the transmission from the drive shaft until another gear is engaged. The shift fork may be actuated manually or under power (e.g., via hydraulic power). In some cases, the shift fork may be eliminated and the shift collar may be engaged with the gear by a hydraulic piston arrangement and disengaged by other mechanical means (e.g., return springs).

SUMMARY OF THE DISCLOSURE

The disclosure provides a hydraulic synchronizer assembly, such as for transmissions and the like in work vehicles.

One aspect the disclosure provides a hydraulic synchronizer for selectively coupling one or more gears to a drive shaft that is rotatable about a rotation axis. A shaft hub is configured to be rotated with the drive shaft and has a first splined annulus and at least one fluid passage. A first ring is disposed about the shaft hub and movable along the rotation axis with respect to the shaft hub. A first shift collar is fixedly coupled to the first ring. The first shift collar has a splined annulus engaged with the first splined annulus of the shaft hub. The first shift collar is configured to engage splines of a first gear when the first ring is in a first axial position and to be disengaged from the spines of the first gear when the first ring is in a first neutral position. The first shift collar is configured to transmit rotational input from the shaft hub to the first gear when the first ring is in the first axial position. First and second hydraulic chambers are configured to receive hydraulic fluid from the at least one fluid passage. Hydraulic pressure in the first hydraulic chamber acts on the first ring to move the first ring to the first axial position and hydraulic pressure in the second hydraulic chamber acts on the first ring to move the first ring to the first neutral position.

Another aspect the disclosure provides a hydraulic synchronizer for selectively coupling first and second gears to a drive shaft that is rotatable about a rotation axis. A shaft hub is configured to be rotated with the drive shaft, the shaft hub having first and second splined annuli and at least one fluid passage. First and second rings, each disposed about the shaft hub, are movable along the rotation axis with respect to the shaft hub. First and second shift collars are fixedly coupled to the associated first and second rings. The first and second shift collars each have a splined annulus configured to be engaged with the associated first and second splined annuli of the shaft hub. The shift collar is configured to engage splines of the associated first and second gears when the associated first and second rings are in the associated first and second axial positions and to be disengaged from the splines of the associated first and second gears when the associated first and second rings are in the associated neutral positions. The first and second shift collars are configured to transmit rotational input from the shaft hub to the associated first and second gears when the associated first and second rings are in the associated first and second axial positions. A plurality of hydraulic pistons are configured to receive hydraulic fluid from the at least one fluid passage and to move the first and second rings to the associated first and second axial positions and the associated neutral positions. The synchronizer is configured to prevent the first and second rings from being in the associated first and second axial positions simultaneously.

The details of one or more embodiments are set forth in the accompanying drawings and the description below. Other features and advantages will become apparent from the description, the drawings, and the claims.

BRIEF DESCRIPTION OF THE DRAWINGS

FIGS. 6A and 7A are enlarged partial section views thereof;

FIGS. 8A-10A are partial side section views of certain components of the example hydraulic synchronizer shown in various positions before and after engagement with the second range gear; and FIGS. 8B-10B are respective partial top section views thereof.

Like reference symbols in the various drawings indicate like elements.

DETAILED DESCRIPTION

Figure 1:
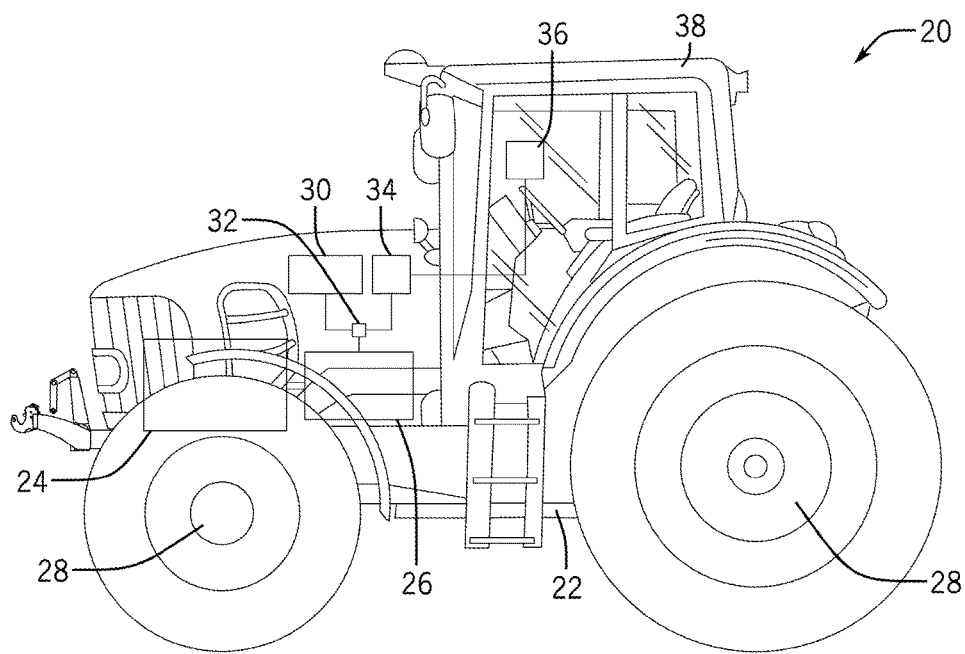
FIG. 1 is side elevational view of a work vehicle in the form of a tractor in which a hydraulic synchronizer according to this disclosure may be incorporated.

The following describes one or more example embodiments of the disclosed hydraulic synchronizer arrangement, as shown in the accompanying figures of the drawings described briefly above. Various modifications to the example embodiments may be contemplated by one of skill in the art.

The term "axial" as used herein refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Additionally, the terms "spline" and splined annulus" and derivatives as used herein include any conventional mechanical connection for transferring torque from one rotating component to another rotating component that is mounted to the torque-transferring rotating component and in the direction of rotation. This may include various known spline configurations, such as parallel splines, involute splines, crowned splines, serrated splines, helical splines and ball splines. This may also include various key and toothed arrangements of various configurations. Thus, these terms do not necessarily specify a particular profile of the intermeshing features and grooves nor a particular mode by which rotational torque is transferred (e.g., key and groove engagement, mating tooth face contact and so on). The terms "annulus" and "annuli" refer to the arrangement of the intermeshing features and grooves, whatever the configuration, in a cylindrical path about the rotating component.

Certain known synchronizers couple the rotating shaft couple to the engine output shaft by movement of a shift rail and fork arrangement, which may be manually or semi-automatically actuated. Generally, one or more fork elements ride along one or more shift rails to displace a synchronizer into engagement with a drive gear of the transmission (e.g., by meshing synchronizer splines with gear splines). The synchronizer is coupled for co-rotation with the shaft, and thus, the engagement of the synchronizer with the gear also couples the gear to the shaft for co-rotation, thereby incorporating the gear into the rotational power (or torque) path from the engine. A blocking member is arranged between the synchronizer and the gear to inhibit displacement of the synchronizer until its splines are clocked with the splines of the gear. The engagement and disengagement of the gear is thus largely, if not entirely, mechanical in the sense that the shift rail actuates the synchronizer back and forth with respect to the gear. The shift rails and forks add to the complexity of the assembly as well as the weight and space taken up by the assembly within the vehicle.

Certain other known synchronizers have been devised that use hydraulic power to couple transmission gears to the engine output shaft. Some of these use a shift rail and fork assembly similar to that described above, although shift fork movement is effected hydraulically. Other systems eliminate the shift rail and fork arrangement entirely. Instead, these systems route hydraulic fluid into chambers that drive pistons to displace shift collars into engagement with the gears. The shift collar is disengaged from a gear by venting the pressure chamber so that one or more return actuation springs acting on the piston can move the shift collar back to a neutral position. These systems may thus be thought of as hybrid mechanical-hydraulic systems in that each mode plays a part in the actuation of the shift collars (i.e., the shift collars are hydraulically engaged and mechanically (spring) released). The spring mechanism adds to manufacturing and assembly complexities and renders the synchronizer susceptible to failure (e.g., by breaking or "sticking" of the springs).

This disclosure addresses several of the issues noted above and may provide for various additional benefits. Generally, disclosed herein is a fully hydraulic synchronizer in which certain mechanical elements (e.g., shift rails, shift forks, actuation springs, etc.) of conventional synchronizers have been eliminated. As such, displacement of the shift collars into both engagement and disengagement positions is accomplished hydraulically.

In certain embodiments, the disclosed hydraulic synchronizer is operable to selectively couple one or more gears to a drive shaft via a shaft hub rotated by the drive shaft. The shaft hub may have a splined annulus and one or more fluid passages. A ring may be disposed about the shaft hub and movable along the shaft axis with respect to the shaft hub. A shift collar may be coupled to the ring and have a splined annulus. The shift collar splines may engage the shaft hub and, when the ring is in an engaged axial position, a gear. The shift collar may be disengaged from the splined annulus of the shaft hub when the ring is in a neutral position. The shift collar thus transmits rotational input from the shaft hub to the gear when the ring is in the engaged axial position. Two hydraulic pistons may receive hydraulic fluid from the fluid passage(s) to move the ring to the engaged and neutral axial positions. In certain embodiments, a second ring and shift collar may be provided to selectively couple a second gear to the shaft hub in which case the synchronizer may alternatively couple either of two gears to the engine.

In certain embodiments, the hydraulic synchronizer may have a dual-acting or two-way piston arrangement of each shift collar/gear that may be coupled to the shaft hub. Each piston arrangement may include a piston element of the associated ring that is acted on by hydraulic fluid within chambers formed between the shaft hub and the ring. For example, each hydraulic chamber may be formed between spaced apart annular walls extending radially from the ring and/or the shaft hub. In the case of multiple shift collar/gear arrangements, the rings may be nested radially inward/outward of one another in which case the inner ring (rather than the shaft hub) may form a wall of the chamber for the outer ring.

In certain embodiments, the hydraulic synchronizer may include a blocking ring arranged to be interposed between each shift collar and the associated gear to inhibit the ring from moving to the engaged axial position until an inner splined annulus of the shift collar is rotationally aligned with a splined annulus of the gear. The blocking ring indexes about the rotation axis relative to the shift collar to permit alignment and engagement of the inner splined annulus of the shift collar with the splined annulus of the gear. A spring may bias the blocking ring against the gear prior to the ring being in the engaged axial position. It is worth emphasizing that in this arrangement the spring is used only to bias the blocking ring, and does not actuate the shift collar, which is engaged and disengaged entirely hydraulically or electrohydraulically.

In certain embodiments, the spring may be retained by a spring retainer having a plurality of fingers interposed between a splined annulus of the blocking ring which engages with the inner splined annulus of the shift collar and allows the inner splined annulus to engage the splined annulus of the gear when the ring is in the engaged axial position. A pin and slot arrangement may rotationally couple the blocking ring and the shaft hub. The pin and slot are configured to allow relative rotation of the blocking ring with respect to the shaft hub to permit the indexing of the blocking ring with respect to the shift collar.

Referring now to the drawings, the disclosed hydraulic synchronizer may be utilized in the context of a wide range of work vehicles, including, agricultural tractors, such as shown in FIG. 1. In this regard, while a tractor is illustrated and described herein as an example work vehicle, one skilled in the art will recognize that principles of the hydraulic synchronizer disclosed herein may be readily adapted for use in other types of work vehicles, including, for example, various other agricultural machines, and other machines used in the construction and forestry industries. As such, the present disclosure should not be limited to applications associated with a tractor or the particular example tractor shown and described.

As shown in FIG. 1, the work vehicle 20 includes a vehicle frame 22. Supported on the vehicle frame 22 is a source of propulsion 24 that supplies power to a transmission 26. In one example, the engine 24 is an internal combustion engine, such as a diesel engine, that is controlled by an engine control module. It should be noted that other forms of propulsion may be provided, such as a fuel cell, an electric motor, a hybrid gas-electric power plant, etc. The transmission 26 transfers the power from the engine 24 to a suitable driveline coupled to one or more driven wheels 28 of the work vehicle 20 to enable the work vehicle 20 to travel over the terrain. In certain embodiments, the work vehicle 20 may include an electrohydraulic system with one or more hydraulic pumps 30 and electrohydraulic valves 32 operated by one or more controllers 34 to control operational modes of the transmission 26. Information related to the transmission (e.g., current drive mode or gear) can be relayed to the operator via an operator interface 36 (e.g., display screen) in an operator cabin 38.

Figure 2:
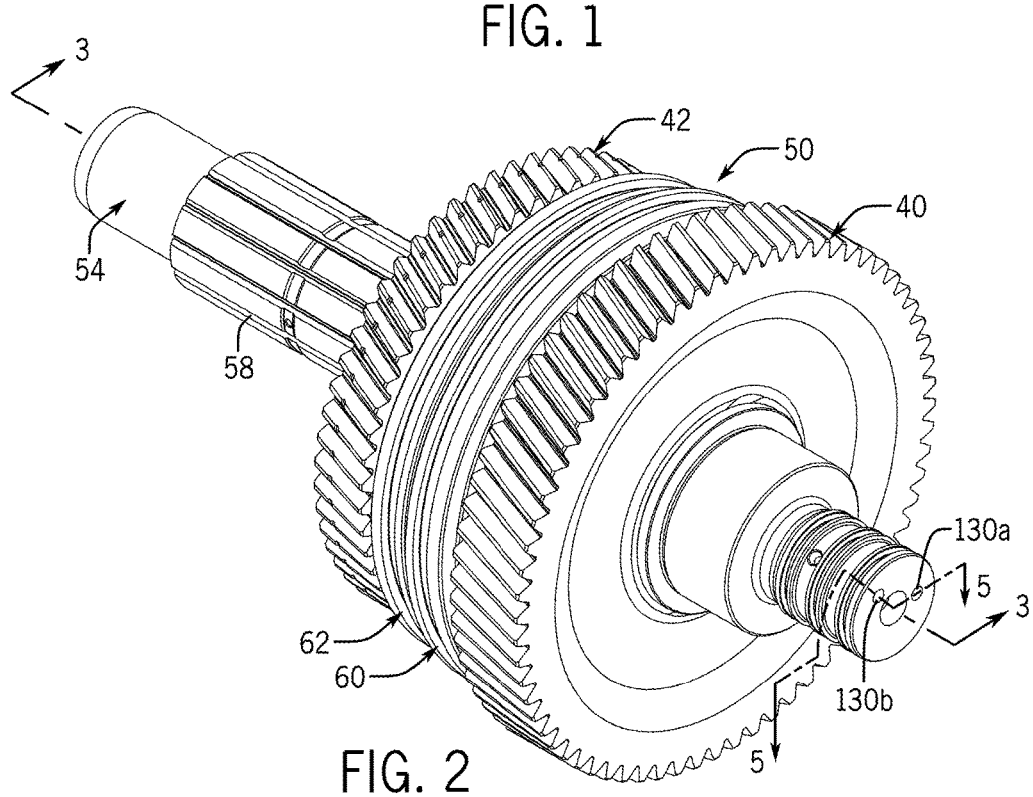
FIG. 2 is a perspective view of an example hydraulic synchronizer disposed between two range gears.
Figure 3:
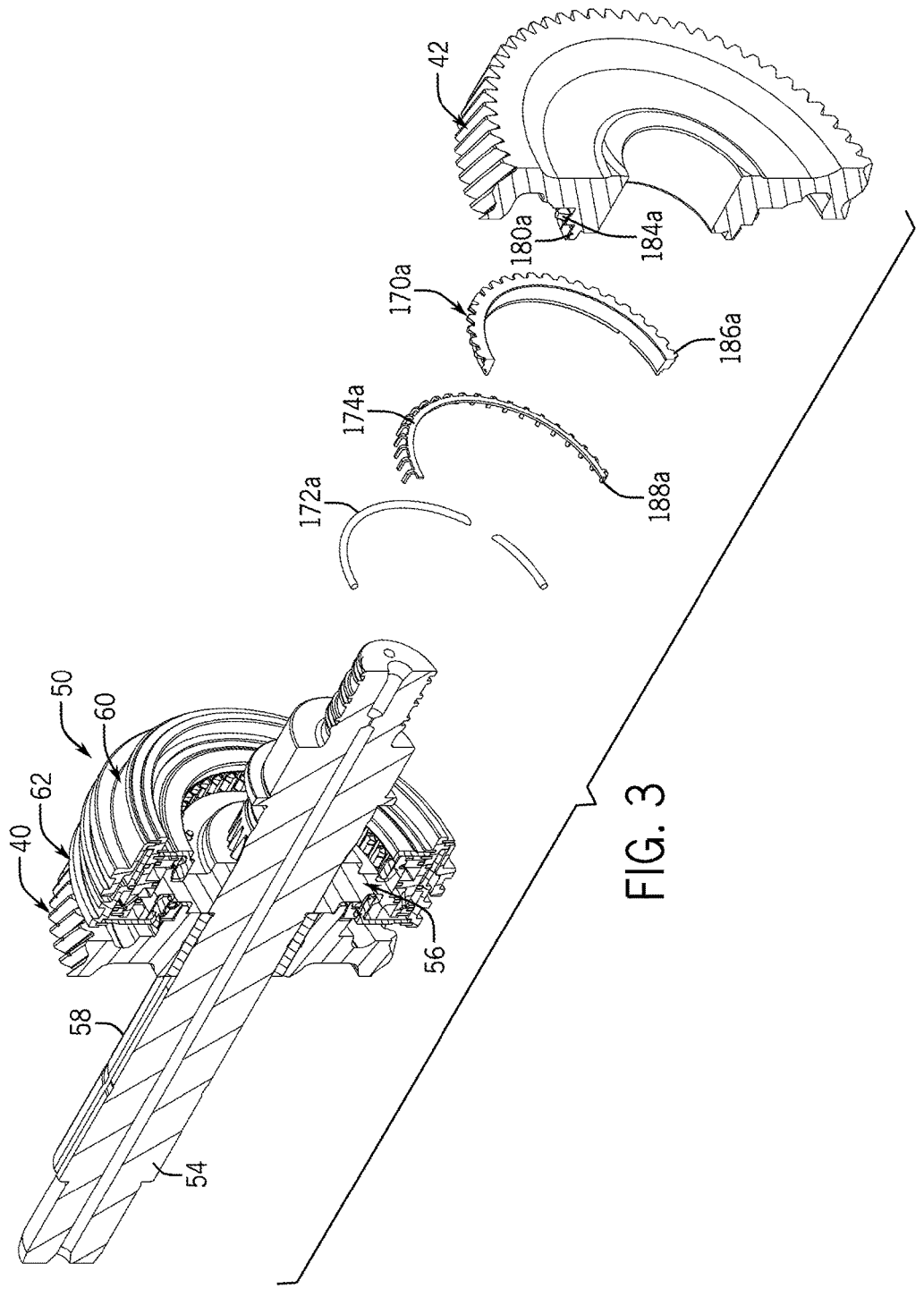
FIG. 3 is a sectional view thereof taken along line 3-3 of FIG. 2 with one range gear and certain other components shown exploded.

Referring now to FIGS. 2 and 3, the transmission 26 may include one or more gears for forward and rearward motion of the work vehicle 20, including multiple forward range gears, such as gears 40, 42, for propelling the work vehicle 20 at various speeds. In order to transition between gears, such as between the gears 40, 42, the transmission 26 may include one or more synchronizers, such as synchronizer 50 disposed between the gears 40, 42, all of which may be concentric with a rotation axis R extending from a drive shaft 54 providing power output from the engine 24. The gears 40, 42 may be mounted directly to smooth sections of the drive shaft 54, or on various bushings or collars, so that that the drive shaft 54 may rotated relative to the gears 40, 42 until whichever one (but not both) of the gears 40, 42 is engaged by the synchronizer 50. The synchronizer 50 may be mounted to the drive shaft 54 by a shaft hub 56 or the like that is mounted to the drive shaft 54 for co-rotation at all times, such as via the mating splines 58 shown in FIG. 3, or via other mating toothed or multi-sided sections of the drive shaft and the shaft hub. In this way, engine torque is applied through the drive shaft 54 and shaft hub 56 to the synchronizer 50, and when engaged, to one of the gears 40, 42.

Figure 4:
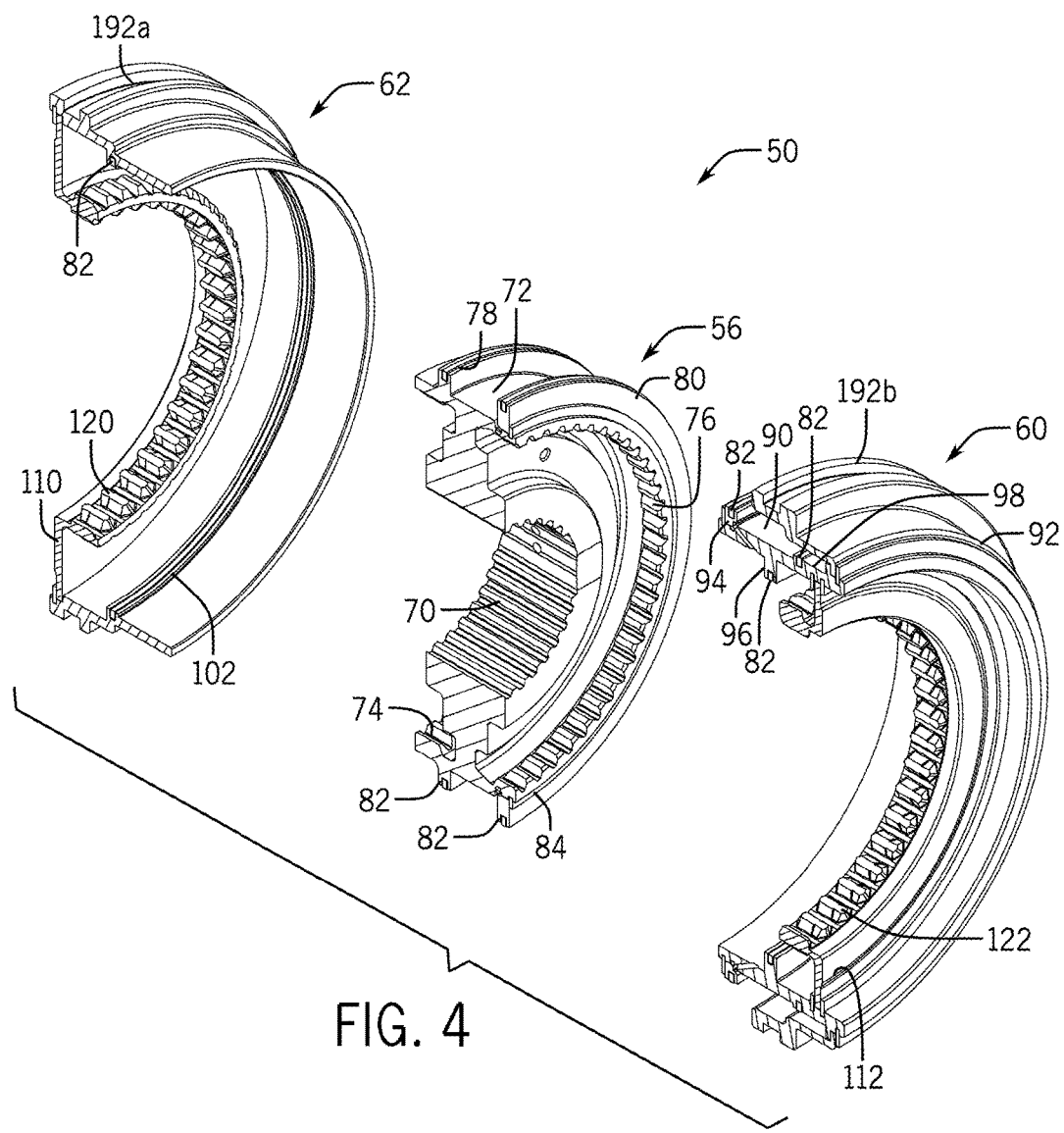
FIG. 4 is an exploded section perspective view of the example hydraulic synchronizer of FIG. 2.
Figure 5:
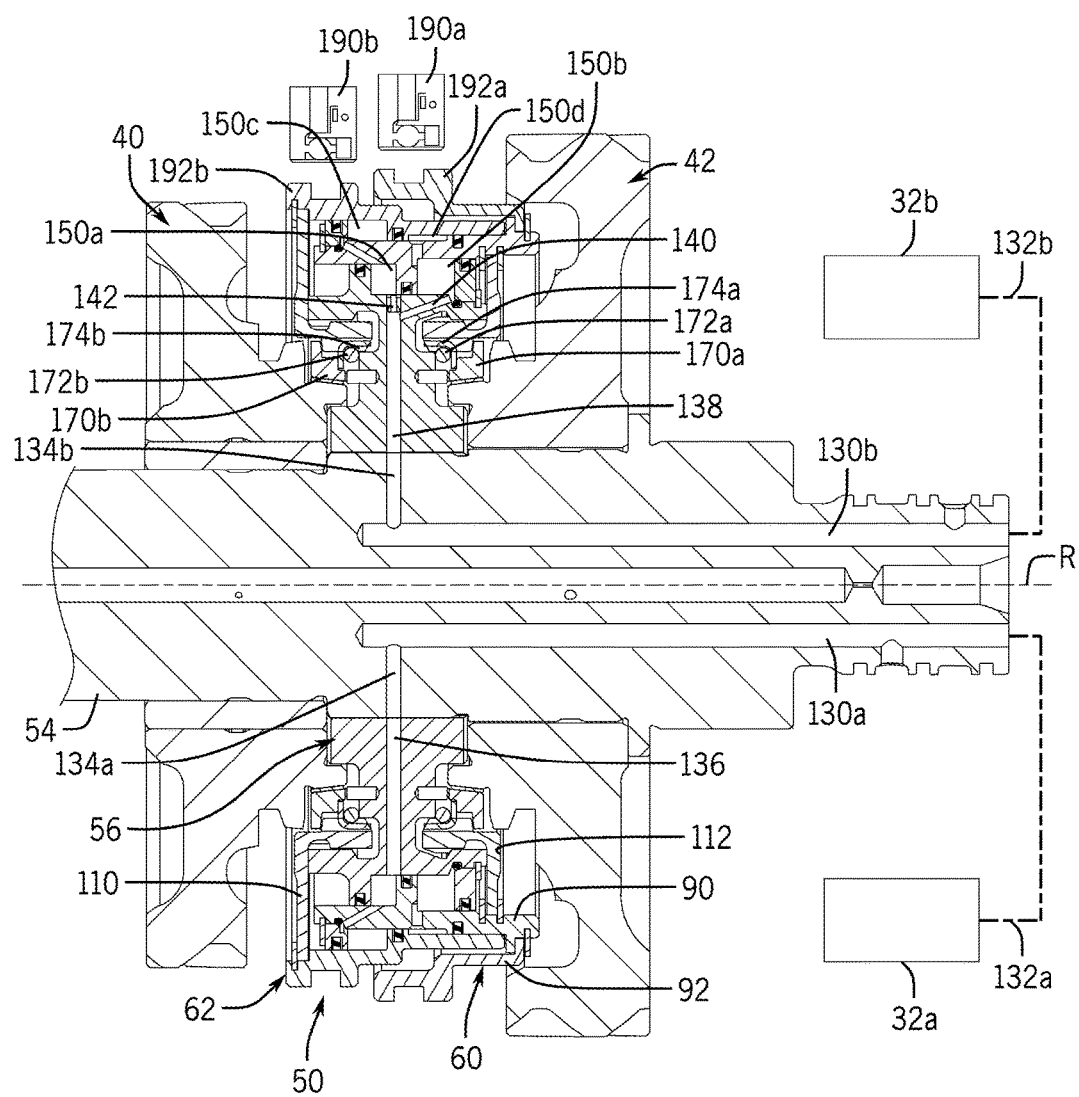
FIG. 5 is a partial section view taken along path 5-5 of FIG. 2 showing the example hydraulic synchronizer in a neutral state.

Referring now also to FIGS. 4 and 5, the hydraulic synchronizer 50 includes two annular bodies or rings mounted to the shaft hub 56. In the illustrated example, the hydraulic synchronizer 50 includes an inner ring 60 that nests radially within an outer ring 62. The rings 60, 62 are configured so that they may move in the axial direction relative to one another and the shaft hub 56. The assembly of the rings 60, 62 to the shaft hub 56 forms multiple fluid chambers in which hydraulic fluid may be directed in a controlled manner to move either the inner ring 60 or the outer ring 62 axially away from the shaft hub 56 during shifting, that is coupling of one of the gears 40, 42 with the drive shaft 54. Controlled venting and filling of one or more the fluid chambers causes the axially shifted ring 60, 62 to return to a neutral position as well as to shift the other ring 60, 62 axially during shifting into the other gear 40, 42.

The illustrated example of the hydraulic synchronizer 50 will now be described in detail for purposes of specifying one or more example arrangements for carrying out the principles of this disclosure. It will be understood, however, that other arrangements may be devised without departing from the scope of this disclosure. As shown, the shaft hub 56 is an annular component with splined central annulus 70 in which the splines project in the direction toward the rotation axis R so as to engage the radially outward projecting splines 58 of the drive shaft 54 so that they mate in interleaving fashion sufficient to transfer rotational torque from the engine 24. From the central annulus 70, the shaft hub 56 extends radially outward along an axially narrowed body to a widened annular periphery 72. The annular periphery 72 defines a pair of spaced apart splined annuli 74, 76, one on each axial side of a radial plane bisecting the shaft hub 56. The splined annuli 74, 76 are formed on an inside periphery of the annular periphery 72 so that the splines project radially inward toward the rotation axis R. Two spaced apart annular walls 78, 80 project radially outward from an outer side of the annular periphery 72, with a generally smooth cylindrical wall therebetween. The walls 78, 80 have grooved ends supporting seals 82. In certain embodiments, the shaft hub 56 may be formed in primarily as a single, monolithic structure with the exception of the wall 80 being a separate piece retained by a snap ring 84 and sealed by an O-ring 86. The O-ring 86 may be held in annular groove 88 such that is it recessed below the outer peripheral surface of the shaft hub 56.

The inner ring 60 is an annular component with a main ring body 90 and a ring extension 92. The ring body 90 has two axially spaced annular walls 94, 96 extending radially inwardly and outwardly on radially inward and outward sides of the ring body 90, respectively, with grooved ends that support additional seals 82. The ring extension 92 is radially spaced from the outer periphery of the ring body 90 except where it connects to the ring body 90. At plateau 98, the outer periphery of the ring body 90 extends radially outward further at the axial side of the ring body 90 where the ring extension 92 connects, and includes a groove for another seal 82. In certain embodiments, the annular wall 96 and the ring extension 92 are separate pieces from the ring body 90 that are connected by additional snap rings 84, such as shown in the illustrated example. Another O-ring 86 may be provided to seal the annular wall 96. Like the groove 88 in the shaft hub 56, an annular groove 100 may contain this O-ring 86 such that is it recessed below the outer peripheral surface of the ring body 90. The outer ring 62 is an annular component with an annular wall 102 extending radially inwardly on a radially inward side of the outer ring 62 with a grooved end that supports another seal 82. The outer ring 62 is sized and shaped so that it nests it fits about the ring body 90 of the inner ring 60, and in part within the space between the ring body 90 and the ring extension 92.

The inner and outer rings 60, 62 mount respective first and second shift collars 110, 112. The shift collar 110 has an angled cross-section the axial leg of which extends axially toward the shaft hub 56 and is radially spaced from the inner periphery of the ring body 90. The shift collar 110 defines a double-sided splined annulus 120 having splines projecting radially inwardly and outwardly toward and away from the rotation axis R. The shift collar 112 has an angled cross-section the axial leg of which extends axially toward the shaft hub 56 and is radially spaced from the inner periphery of the outer ring 62 and defines another double-sided splined annulus 122 having splines projecting radially inwardly and outwardly toward and away from the rotation axis R. In certain embodiments, the shift collars 110, 112 are separate pieces from the inner and outer rings 60, 62 that are connected by additional snap rings 84, such as shown in the illustrated example.

Hydraulic fluid may be routed to the hydraulic synchronizer 50 through various internal passages. As shown in FIG. 5, for example, the drive shaft 54 may have two or more (two shown) fluid passages 130*a*, 130*b* running in the axial direction from openings at the end of the drive shaft 54 that are coupled to hydraulic lines 132*a*, 132*b* leading from two associated electrohydraulic valves 32*a*, 32*b*. Two radial fluid passages 134*a*, 134*b* may join the respective axial fluid passages 130*a*, 130*b*, one going to fluid passage 136 and the other to fluid passage 138, each of which runs separately through the shaft hub 56. One or more (one shown) fluid passages 140 may branch off from the fluid passage 138. In certain embodiments, the fluid passages 138, 140 are formed as through bores in the shaft hub 56 after which the open end of the fluid passage 138 is closed by a plug 142, such as shown in the drawings.

The fluid passages 130*a/b*, 134, 136, 138 and 140 deliver hydraulic fluid to hydraulic chambers defined by the assembly of the shaft hub 56 and the inner and outer rings 60, 62. When filled with pressurized hydraulic oil, the hydraulic chambers may be characterized as "hydraulic pistons" or "pistons" since the pressurized fluid drives movement of the hydraulic synchronizer 50. Alternatively, the components which are acted upon by the pressurized fluid in the hydraulic chambers may be characterized as "pistons" since such components are the physical bodies that drive the movement. In either case, the motive force is generated by pressure applied to a facial surface of one or more walls of the inner and outer rings 60, 62 from within a confined, albeit variable, volume. For this reason, the following will discuss the example hydraulic synchronizer 50 in terms of the configuration and flow to and from the "hydraulic chambers" formed within the hydraulic synchronizer 50.

In the illustrated example, there are four hydraulic chambers 150*a*, 150*b*, 150*c* and 150*d*. Hydraulic chambers 150*a* and 150*b* are formed between the shaft hub 56 and the inner ring 60, and hydraulic chambers 150*c* and 150*d* are formed between the inner ring 60 and the outer ring 62. Vent passages 160, 162 in the inner ring 60 allow communication between hydraulic chambers 150*a* and 150*c* and between hydraulic chambers 150*b* and 150*d*, respectively. The hydraulic chamber 150*a* is confined axially by the annular wall 78 of the shaft hub 56 and the annular wall 96 of the inner ring 60, and the hydraulic chamber 150*b* is confined axially by the annular wall 96 of the inner ring 60 and the annular wall 80 of the shaft hub 56. The hydraulic chamber 150*c* is confined axially by the annular wall 96 of the inner ring 60 and the annular wall 102 of the outer ring 62, and the hydraulic chamber 150*d* is confined axially by the annular wall 102 of the outer ring 62 and the raised plateau 98 of the inner ring 60. There are six seals 82, in addition to the two O-rings 86, used to seal the hydraulic chambers 150*a-d*, all of which provide a dynamic seal between relatively movable parts.

Generally, the shaft hub 56 is rotating during operation and does not move axially. During shifting to and from the gear 42 (at the right in FIG. 5), the inner ring 60 slides axially relative to the shaft hub 56 and the outer ring 62, which is held in a neutral position, as shown in FIG. 5. During shifting to and from the gear 40 (at the left in FIG. 5), the outer ring 62 slides axially relative to the shaft hub 56 and the inner ring 60, which is held in a neutral position, as shown in FIG. 5. Thus, the annular wall 96 of the inner ring 60 may be characterized as a dual-acting piston, shifting the inner ring 60 axially in either direction when pressurized. Similarly, the annular wall 102 of the outer ring 62 also functions as a dual-acting piston, shifting the outer ring 62 axially in either direction when pressurized. The annular walls 78, 80 of the shaft hub 56, and the annular wall 94 and the raised plateau 98 of the inner ring 60 serve to confine the axial ends of the hydraulic chambers as well as to provide mechanical travel stops.

The hydraulic synchronizer 50 may be held in the neutral state shown in FIG. 5, in either of two ways, namely, by maintaining the hydraulic chambers 150*a-d* in open communication to the hydraulic pressure source (e.g., by opening or otherwise operating both of the control valves 32*a*, 32*b* in "pressure" mode), or by venting the hydraulic chambers 150*a-d* to tank (e.g., by closing or otherwise operating both of the control valves 32*a*, 32*b* in "tank" mode). The former case will be explained below. In the latter case, sufficient pressure may be maintained in the hydraulic chambers 150*a-d* to center the inner and outer rings 60, 62 in their neutral positions by centrifugal force arising from the high-speed rotation of the hydraulic synchronizer 50.

Figure 6B:
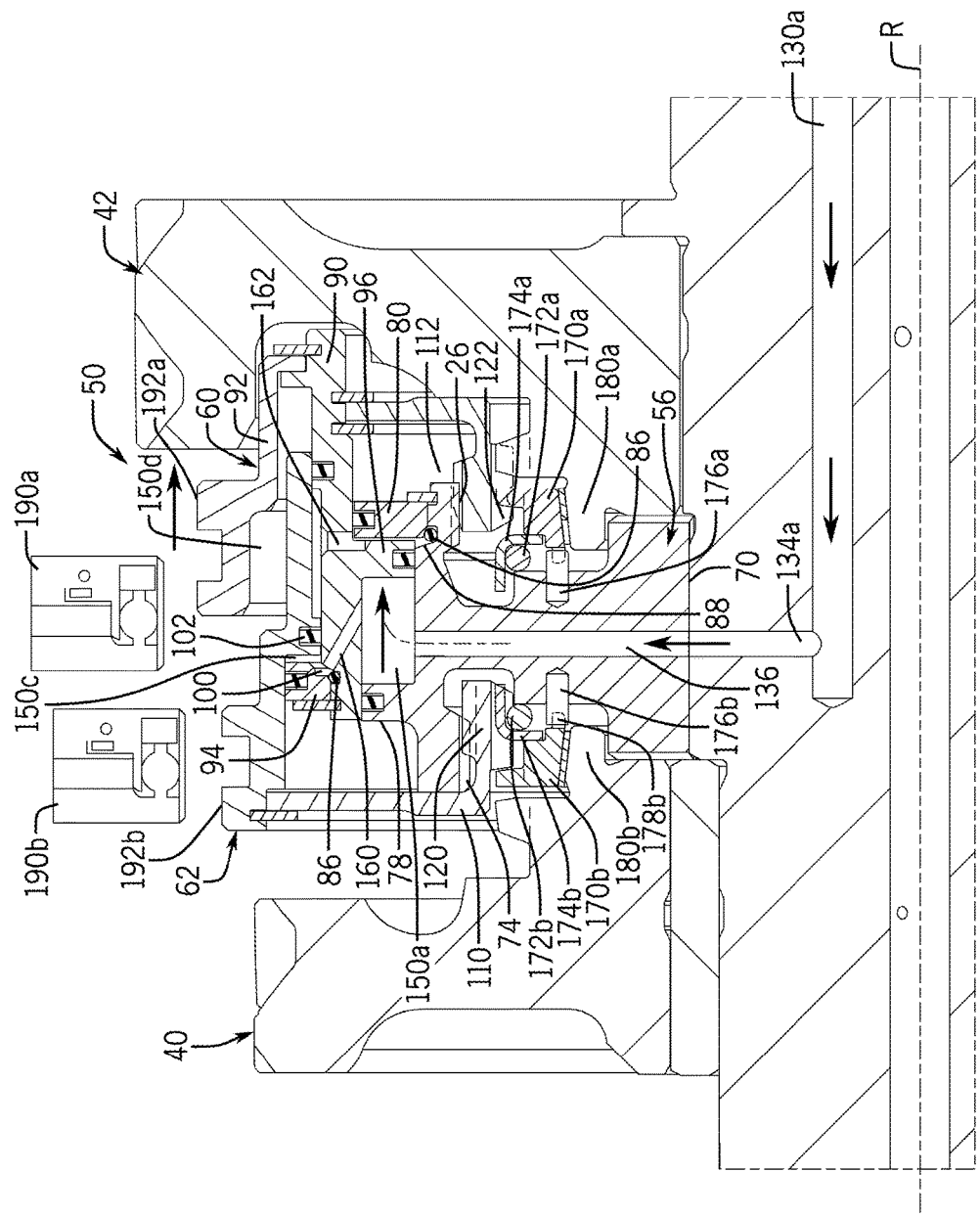
FIGS. 6B and 7B are views similar to respective FIGS. 6A and 7A showing the example hydraulic synchronizer alternatively engaged with first and second gears.

More specifically, to move the inner ring 60 to the axial position necessary to engage the shift collar 112, the control valve 32*a* will be in pressure mode and control valve 32*b* will be energized to tank mode. In this way, the hydraulic line 132*a* and the drive shaft fluid passages 130*a*, 134*a* are pressurized as is fluid passage 136 in the shaft hub 56. Because the fluid passage 136 is always in communication with the hydraulic chamber 150*a* regardless of the axial position of the inner ring 60 (which is prevented from closing off or rerouting flow from the fluid passage 136 by interference of the shift collar 112 and the shaft hub 56) the hydraulic chamber 150*a* (and the hydraulic chamber 150*c* via the vent passage 160) are pressurized. Further, fluid passages 138, 140 are always in communication with the hydraulic chamber 150*b* via groove 88 in the shaft hub 56 regardless of the axial position of the inner ring 60 so that the hydraulic chambers 150*b*, 150*d* may be vented to tank through the fluid passages 130*b*, 134*b*, 138, 140 as pressure builds up from the reducing volume of these chambers resulting from the axial movement of the inner ring 60 from its neutral position shown in FIG. 6A to the engaged position shown in FIG. 6B.

By returning both valves 32*a*, 32*b* to pressure mode, pressure is supplied (via the hydraulic line 132*b* and the fluid passages 130*b*, 134*b*, 138, 140) to the hydraulic chamber 150*b* (and hydraulic chamber 150*d* via vent passage 162). The surface area of the face of the annular wall 102 in the hydraulic chamber 150c is greater than that of hydraulic chamber 150d such that the outer ring 62 remains in the neutral position shown in FIG. 6A. The surface area of the face of the annular wall 96 in the hydraulic chamber 150b is greater than that in the hydraulic chamber 150a such that the force of the hydraulic chamber 150b will overcome that of in the hydraulic chamber 150a and return the inner ring 60 to its neutral position shown in FIG. 6A. As the inner ring 60 moves in either axial direction, the fluid may flow through the vent passages 160, 162 in the direction from the hydraulic chamber that is decreasing in volume to the hydraulic chamber that is expanding. Any increase in pressure within the hydraulic chamber 150a from the reduced volume arising from movement of the inner ring 60 back to neutral that exceeds the supply pressure will be forced back to tank via the appropriate passages and lines.

Figure 7A:
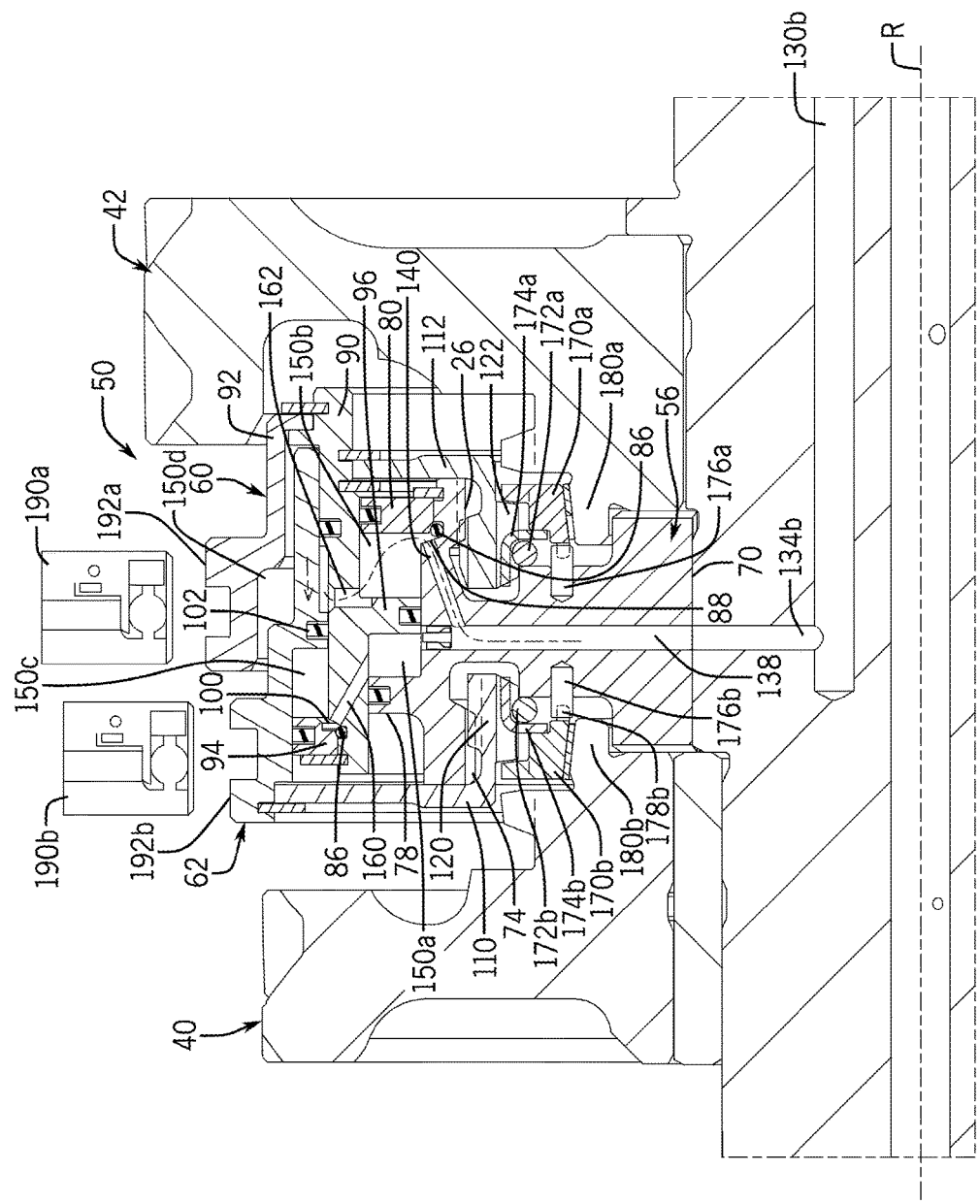
Figure 7B:
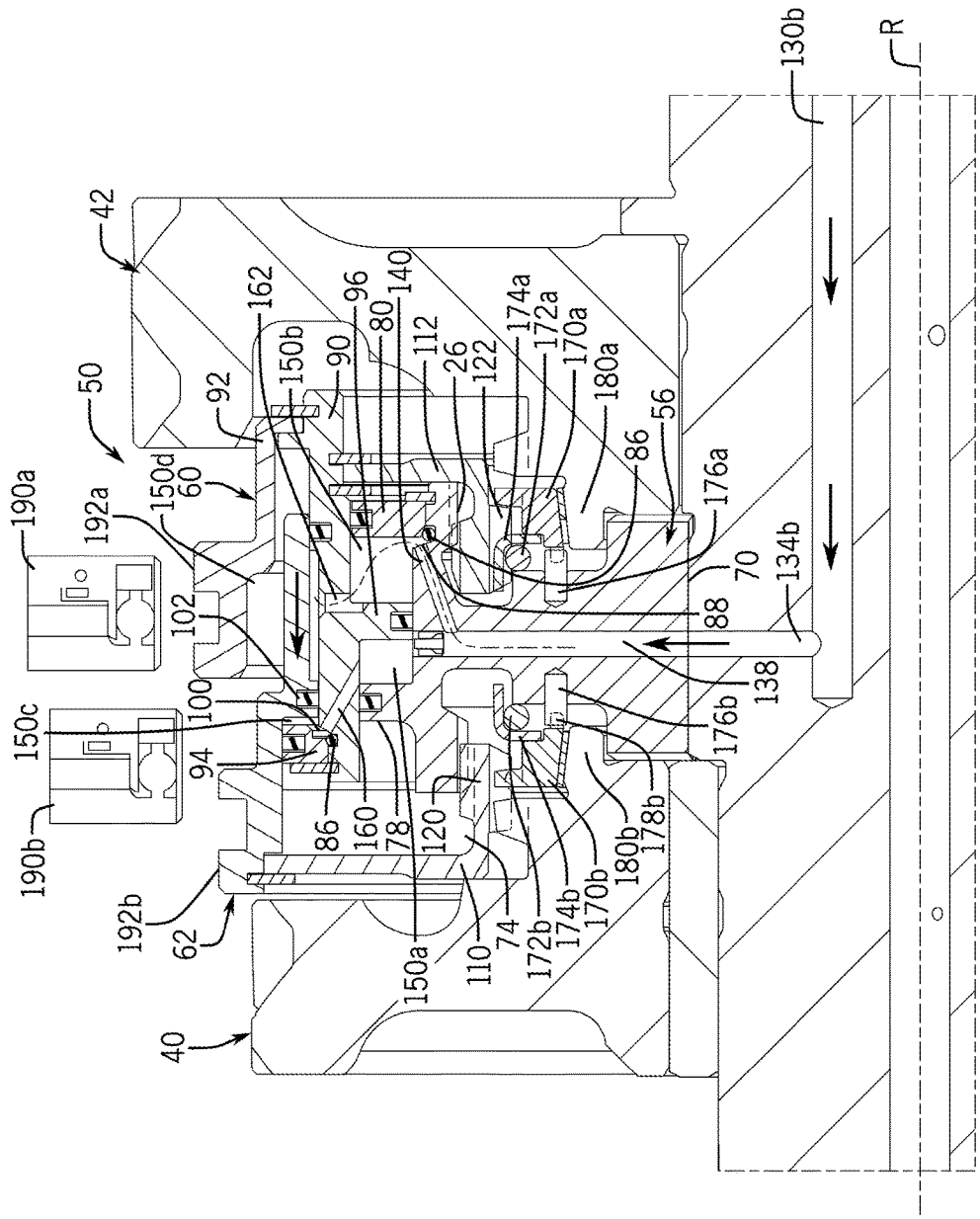

The gear 40 is engaged by moving the outer ring 62 from its neutral position shown in FIG. 7A to the axial position necessary to engage the shift collar 110, as shown in FIG. 7B. This is accomplished by energizing the control valve 32a to tank mode and the control valve 32b pressure mode, thereby pressurizing the hydraulic line 132b, the drive shaft fluid passages 130b, 134b and shaft hub fluid passage 138. Because the fluid passage 138 is always in communication with the hydraulic chamber 150b regardless of the axial position of the inner ring 60, the hydraulic chamber 150b (and the hydraulic chamber 150d via the vent passage 162, which is always in communication with the hydraulic chamber 150b regardless of the axial position of the outer ring 62) are pressurized. Further, fluid passage 136 is always in communication with the hydraulic chamber 150a (and hydraulic chamber 150c via groove 100) regardless of the axial position of the inner and outer rings 60, 62 so that the hydraulic chambers 150a, 150c may be vented to tank through fluid passages 130a, 134a, 136 as pressure builds up from the reducing volume of these chambers resulting from the axial movement of the outer ring 62 from its neutral position shown in FIG. 7A to the engaged position shown in FIG. 7B.

By returning both valves 32a, 32b to pressure mode, pressure is supplied (via the hydraulic line 132a and the fluid passages 130a, 134a, 136) to the hydraulic chamber 150a (and hydraulic chamber 150c via vent passage 160). The surface area of the face of the annular wall 96 in the hydraulic chamber 150b is greater than that of hydraulic chamber 150a such that the inner ring 60 will remain in its neutral position shown in FIG. 7A. The surface area of the face of the annular wall 102 in the hydraulic chamber 150c is greater than that in the hydraulic chamber 150d such that the force of the hydraulic chamber 150c will overcome that of the hydraulic chamber 150d and return the outer ring 62 to its neutral position shown in FIG. 7A. Like the inner ring 60, as the outer ring 62 moves in either axial direction, the fluid may flow through the vent passages 160, 162 in the direction from the hydraulic chamber that is decreasing in volume to the hydraulic chamber that is expanding. Any increase in pressure within the hydraulic chamber 150d from the reduced volume arising from movement of the outer ring 62 back to neutral that exceeds the supply pressure will be forced back to tank via the appropriate passages and lines.

Proper intermeshing of each of the shift collars 110, 112 with its respective gear 40, 42 is facilitated by a spring-biased blocking arrangement that serves to physically interfere with axial movement of the shift collars 110, 112 (and thereby the inner and outer rings 60, 62) into the path of the gears 40, 42 until the two components are clocked such that the splines of the shift collar are axially (or rotationally) aligned with the grooves between the splines of the gear. In addition, since the shift collars 110, 112, and indeed the entire hydraulic synchronizer 50, rotates with the drive shaft 54 continuously, the blocking member is used to initiate rotation of the gear and bring it up to the speed of the drive shaft 54. Only after the shift collar and gear are co-rotating in the proper clocking does the blocking arrangement permit the shift collar to slide axially to intermesh the splines.

Referring again to FIGS. 3 and 5, in the illustrated example of the hydraulic synchronizer 50 there are two blocking arrangements, one for each shift collar 110, 112 and gear 40, 42 pairing. Each blocking arrangement includes a blocking ring 170a, 170b, a spring 172a, 172b, and a spring retainer 174a, 174b. The blocking rings 170a, 170b are coupled to, and thereby co-rotated with, the shaft hub 56 by pins 176a, 178b (which may be formed into, or attached to, the shaft hub) and which fit into corresponding openings in the blocking rings 170a, 170b. The blocking rings 170a, 170b have tapered inner diameters configured to match the tapers of cone sections 180a, 180b of the gears 40, 42. As is understood, the mating tapers provide for frictional engagement of the block rings 170a, 170b with the cones 180a, 180b of the gears 40, 42 as the pair of components are brought together (i.e., the blocking rings are advanced axially toward the gears), allowing for some relative rotation (or slippage) at the early stages of engagement. In certain embodiments each inner diameter of the blocking rings 170a, 170b may include (e.g., by adhesive bonding) a layer of friction material to aid in establishing a robust frictional connection between the blocking rings 170a, 170b and the cones 180a, 180b. In such cases, cooling grooves and the like may be formed into the frictional material to aid in heat dissipation.

Figure 8A:
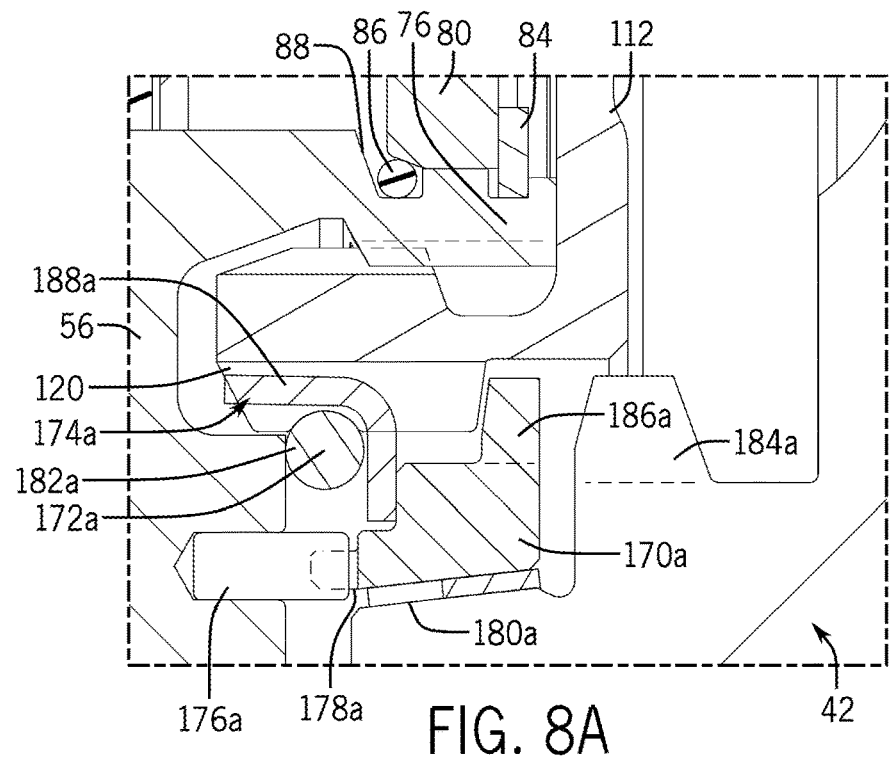
Figure 8B:
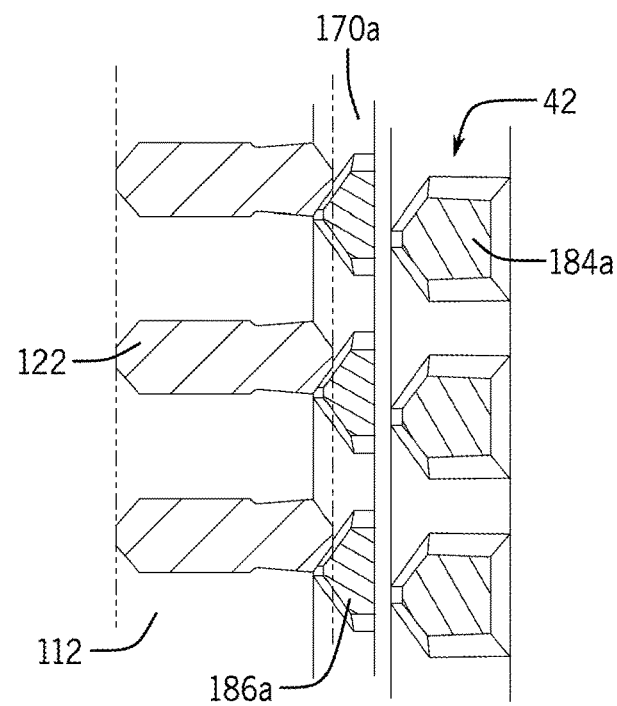
Figure 9A:
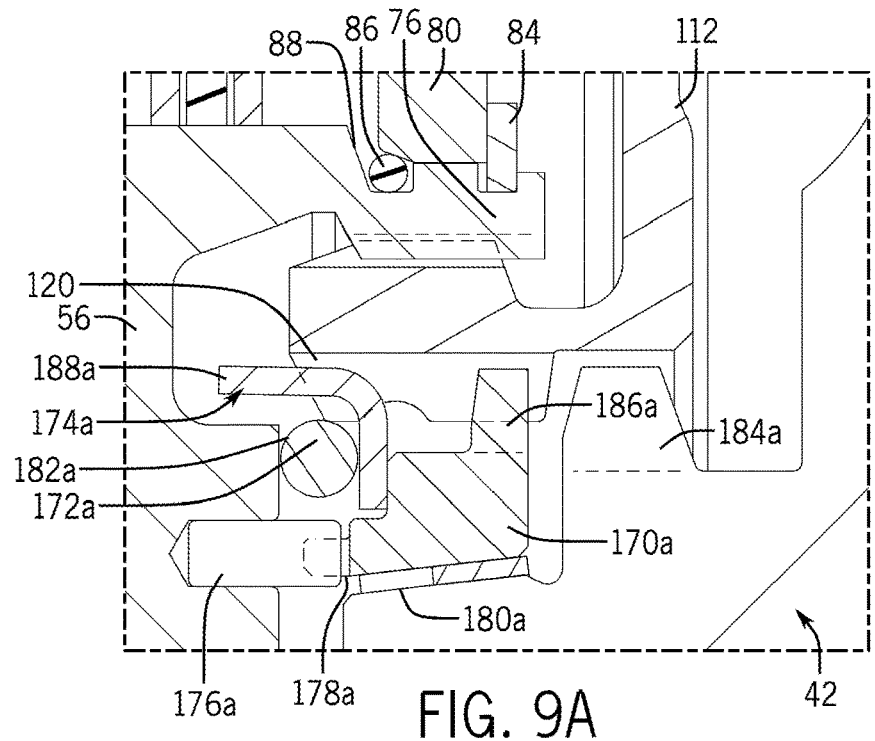
Figure 9B:
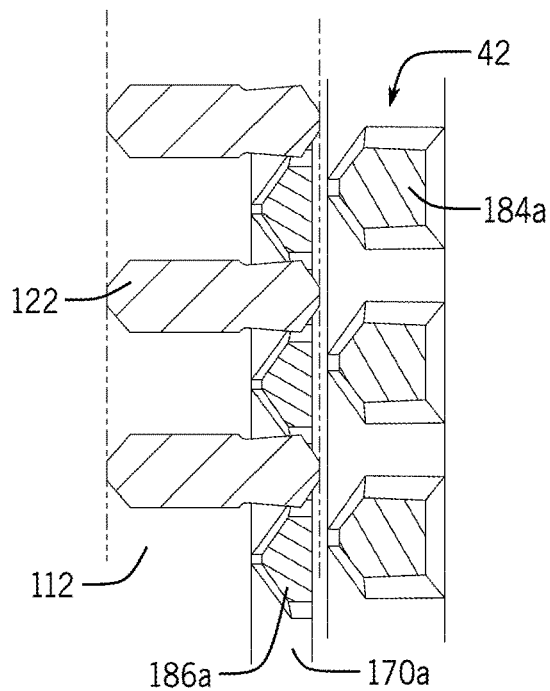
Figure 10A:
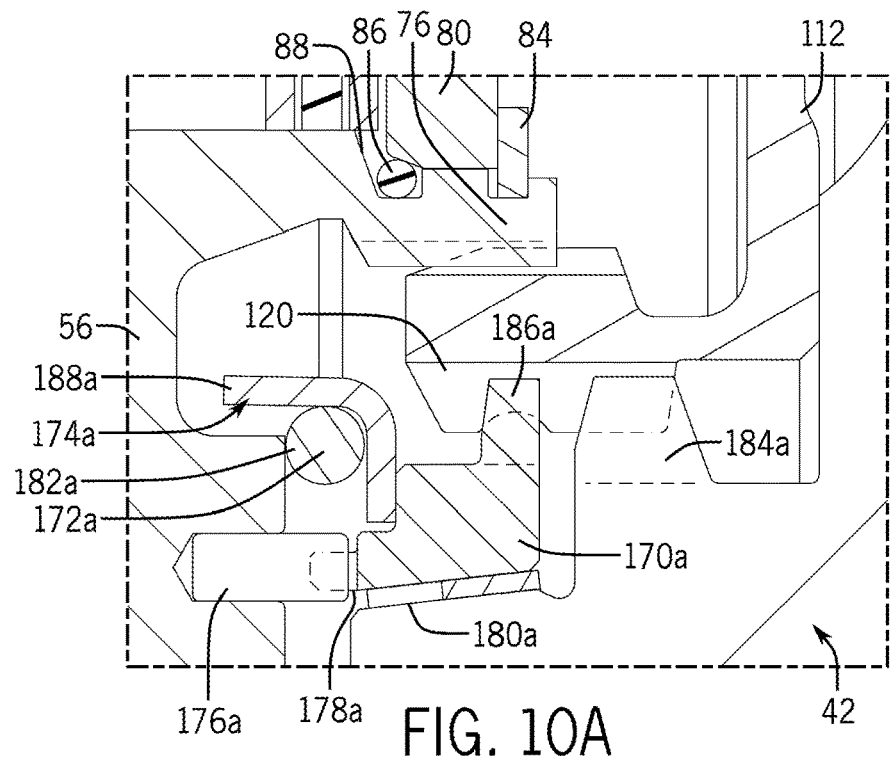
Figure 10B:
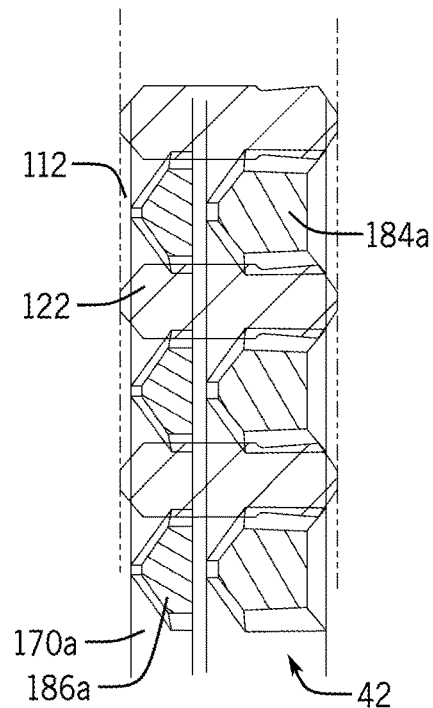

For simplicity and clarity, only the blocking arrangement with the blocking ring 170a will be described in detail with reference to FIGS. 8A-10B. However, it will be understood that the following discussion may apply to the blocking arrangement with the blocking ring 170b as well. As noted, the blocking ring 170a rotates with the shaft hub 56 due to the interaction of the pin 176a with a slot 178a in the blocking ring 170a. The slot 178a is elongated to allow for some limited relative rotation of the blocking ring 170a with respect to the shaft hub 56. During shifting, as the inner ring 60 moves axially to drive the shift collar 112 toward the gear 42, the spring 172a pushes the blocking ring 170a against the gear 42. Initially there will be a differential between the rotational speed of the blocking ring 170a (and thus the rest of the synchronizer 50 and the drive shaft 54) and the gear 42. The spring force biasing the blocking ring 170a against the gear 42 along with the speed differential creates torque on the blocking ring 170a, which causes it to rotate relative to the shaft hub 56 until the pin 176a meets the end of the slot 178, after which it continues to co-rotate with the shaft hub 56. This positions the blocking ring 170a in a position that interferes with the axial path of the shift collar 112, as illustrated in FIGS. 8A and 8B. As the shift collar 112 continues to travel, the tooth points of the splines 122 contact the tooth points of splines 186a of the blocking ring 170a. The angled tips create torque on the blocking ring 170a tending to clear the blocking ring 170a from the path of the splines 122 of the shift collar 112. However, this torque is resisted by torque from the engagement of the blocking ring 170a (or its friction material) and the cone 180a of the gear 42, which is still rotating at a different speed. Upon the gear 42 being accelerated or decelerated to match the synchronizer 50 speed, the frictional torque with the cone 180a dissipates to allow the shift collar 112 is able to pass through the blocking ring 170a, as illustrated in FIGS. 9A and 9B. At this stage, the gear 42 may not be clocked with the blocking ring 170a, as shown. However, as the shift collar 112 travels further, tooth point contact between the shift collar 112 and the gear 42 will create torque that indexes the blocking ring 170a slightly (as permitted by the pin 176a and slot 178a arrangement) until the splines 122 of the shift collar 112 can fully engage with the splines 184a of the gear 42, as illustrated in FIGS. 10A and 10B. In this way, the shift collar 112 can engage and couple the gear 42 to the drive shaft 54 smoothly and without excessive wear on the drive shaft 54, the gear 42 or the synchronizer 50.

The spring 172a is captured circumferentially by narrow prongs 188a of the spring retainer 174a, which fit between the splines 122 of the shift collar 112. The spring retainer 174a may be arranged to "float" within the synchronizer 50 in that it is not fixedly mounted, but rather is located about an outer periphery of the blocking ring 170a. The spring 172a is compressed into a groove 182a formed in the splines 122 of the shift collar 112. As the shift collar 112 moves, the spring 172a applies an axial force against a radial face of the blocking ring 170. The axial force is an axial component of the radial force applied to the spring 172a by engagement with a ramp angle of the groove 182a of the shift collar 112. Thus, as the shift collar 112 moves toward the gear 42, the blocking ring 170a is positioned first to engage the gear 42 in order to achieve the indexing and rotationally clocking described above.

In addition, in certain embodiments gear selection may be determined by one or more sensors that detect the axial position of the inner and outer rings 60, 62. For example, proximity sensors 190a, 190b may be mounted within the transmission housing near peripheral flanges 192a, 192b that project radially outward from the outer periphery of the respective inner and outer rings 60, 62. Other sensor technology and sensed areas may be employed, and the detected positions of the inner and outer rings 60, 62 may be used for various purposes. For example, the sensors 190a, 190b may be part of a feedback loop to the controller 34 to provide an input signal indicative of the state of the hydraulic synchronizer 50 and/or confirmation of the gear selection. The controller 34 may use this feedback to control operation of the electrohydraulic system, and the control valves 32 in particular. The controller 34 may also output a feedback signal to the operator interface 36 to provide the operator with a visual indication of the current gear engaged. The controller 34 may also monitor the feedback signals from the sensors 190a, 190b for operational anomalies or for diagnostic purposes.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A hydraulic synchronizer for selectively coupling one or more gears to a drive shaft that is rotatable about a rotation axis, the synchronizer comprising:
    a shaft hub configured to be rotated with the drive shaft, the shaft hub having a first splined annulus and at least one fluid passage;
    a first ring disposed about the shaft hub and movable along the rotation axis with respect to the shaft hub;
    a first shift collar fixedly coupled to the first ring, the first shift collar having a splined annulus engaged with the first splined annulus of the shaft hub, the shift collar being configured to be disengaged from splines of a first of the gears when the first ring is in a first neutral position and to engage the splines of the first gear when the first ring is in a first axial position so as to transmit rotational input from the shaft hub to the first gear; and
    first and second hydraulic chambers configured to receive hydraulic fluid from the at least one fluid passage;
    wherein hydraulic pressure in the first hydraulic chamber acts on the first ring to move the first ring to the first axial position and hydraulic pressure in the second hydraulic chamber acts on the first ring to move the first ring to the first neutral position.

2. The synchronizer of claim 1, wherein the first and second hydraulic chambers extend axially between spaced apart annular walls extending radially from at least one of the first ring and the shaft hub.

3. The synchronizer of claim 1, wherein the splined annulus of the first shift collar is a double splined annulus having a set of radially inwardly projecting splines and a set of radially outwardly projecting splines; and
    wherein the outwardly projecting splines engage the first splined annulus of the shaft hub.

4. The synchronizer of claim 3, further including a first blocking ring arranged to be interposed between the first shift collar and the first gear when the shaft hub is mounted to the drive shaft, the first blocking ring preventing the first ring from moving to the first axial position until the radially inwardly projecting splines of the first shift collar are rotationally aligned with the splines of the first gear; and
    wherein the first blocking ring indexes about the rotation axis relative to the first shift collar to permit alignment and engagement of the inwardly projecting splines of the first shift collar with the splines of the first gear.

5. The synchronizer of claim 4, wherein the first blocking ring being biased against the first gear by a first spring; and
    wherein the first spring is retained by a first spring retainer having a plurality of fingers interposed between a splined annulus of the first blocking ring which engages with the radially inwardly projecting splines of the first shift collar and allows them to engage the splines of the first gear when the first ring is in the first axial position.

6. The synchronizer of claim 5, further including a first pin rotationally coupling the first blocking ring with the shaft hub;

wherein the first pin allows for relative rotation of the first blocking ring with respect to the shaft hub to permit the indexing of the first blocking ring with respect to the first shift collar.

7. The synchronizer of claim 1, further including:
a second ring disposed about the shaft hub and movable along the rotation axis with respect to the shaft hub;
a second shift collar fixedly coupled to the second ring, the second shift collar having a splined annulus engaged with a second splined annulus of the shaft hub, the shift collar being configured to be disengaged from splines of a second of the gears when the second ring is in a second neutral position and to engage the splines of the second gear when the second ring is in a second axial position so as to transmit rotational input from the shaft hub to the second gear; and
third and fourth hydraulic chambers configured to receive hydraulic fluid from the at least one fluid passage;
wherein hydraulic pressure in the third hydraulic chamber acts on the second ring to move the second ring to the second axial position and hydraulic pressure in the fourth hydraulic chamber acts on the second ring to move the second ring to the second neutral position.

8. The synchronizer of claim 7, wherein the first and second rings are arranged radially with respect to one another with the first ring being an inner ring nested within the second, outer ring.

9. The synchronizer of claim 7, wherein the third and fourth hydraulic chambers extend axially between spaced apart annular walls extending radially from at least one of the first ring and the second ring.

10. The synchronizer of claim 7, wherein the splined annulus of the second shift collar is a double splined annulus having a set of radially inwardly projecting splines and a set of radially outwardly projecting splines; and
wherein the outwardly projecting splines of the second shift collar engage the second splined annulus of the shaft hub.

11. The synchronizer of claim 10, further including a second blocking ring arranged to be interposed between the second shift collar and the second gear when the shaft hub is mounted to the drive shaft, the second blocking ring preventing the second ring from moving to the second axial position until the radially inwardly projecting splines of the second shift collar are rotationally aligned with the splines of the second gear; and
wherein the second blocking ring indexes about the rotation axis relative to the second shift collar to permit alignment and engagement of the inwardly projecting splines of the second shift collar with the splines of the second gear.

12. The synchronizer of claim 11, wherein the second blocking ring is biased against the second gear by a second spring; and
wherein the second spring is retained by a second spring retainer having a plurality of fingers interposed between a splined annulus of the second blocking ring which engages with the radially inwardly projecting splines of the second shift collar and allows them to engage the splines of the second gear when the second ring is in the second axial position.

13. The synchronizer of claim 12, further including a second pin rotationally coupling the second blocking ring with the shaft hub;
wherein the second pin allows for relative rotation of the second blocking ring with respect to the shaft hub to permit the indexing of the second blocking ring with respect to the second shift collar.

14. A hydraulic synchronizer for selectively coupling first and second gears to a drive shaft that is rotatable about a rotation axis, the synchronizer comprising:
a shaft hub configured to be rotated with the drive shaft, the shaft hub having first and second splined annuli and at least one fluid passage;
first and second rings each disposed about the shaft hub and movable along the rotation axis with respect to the shaft hub;
first and second shift collars fixedly coupled to the associated first and second rings, the first and second shift collars each having a splined annulus engaged with the associated first and second splined annuli of the shaft hub, the associated first and second shift collars being configured to engage splines of the associated first and second gears when the associated first and second rings are in the associated first and second axial positions and to be disengaged from the splines of the associated first and second gears when the associated first and second rings are in associated first and second neutral positions, the first and second shift collars being configured to transmit rotational input from the shaft hub to the associated first and second gears when the associated first and second rings are in the associated first and second axial positions; and
a plurality of hydraulic chambers configured to receive hydraulic fluid from the at least one fluid passage and configured to move the first and second rings to the associated first and second axial positions and the associated neutral positions;
wherein hydraulic pressure in a first of the hydraulic chambers acts on the first ring to move the first ring to the first axial position and hydraulic pressure in a second of the hydraulic chambers acts on the first ring to move the first ring to the first neutral position.

15. The synchronizer of claim 14, wherein the first and second rings are arranged radially with respect to one another with the first ring being an inner ring nested within the second, outer ring.

16. The synchronizer of claim 14, wherein the first and second of the hydraulic chambers extend axially between spaced apart annular walls extending radially from at least one of the first ring and the shaft hub; and
wherein third and fourth of the hydraulic chambers extend axially between spaced apart annular walls extending radially from at least one of the first ring and the second ring.

17. The synchronizer of claim 16, further including first and second blocking rings arranged to be interposed between the associated first and second shift collars and the associated first and second gears when the synchronizer is mounted to the drive shaft, the first and second blocking rings preventing the associated first and second rings from moving to the associated first and second axial positions until inner splined annuli of the associated first and second shift collars are rotationally aligned with splined annuli of the associated first and second gears.

18. The synchronizer of claim 17, wherein the first and second blocking rings index about the rotation axis relative to the associated first and second shift collars to permit alignment and engagement of the inner splined annuli of the associated first and second shift collars with the splined annuli of the associated first and second gears.

19. The synchronizer of claim 18, wherein the associated first and second blocking rings are biased against the associated first and second gears by associated first and second springs; and wherein the first and second springs are retained by associated first and second spring retainers each having a plurality of fingers interposed between splined annuli of the associated first and second blocking rings which engage with the inner splined annuli of the associated first and second shift collars and allow the inner splined annuli of the associated first and second shift collars to engage the splined annuli of the associated first and second gears when the associated first and second rings are in the associated first and second axial positions.

20. The synchronizer of claim 19, further including first and second pins rotationally coupling the associated first and second blocking rings with the shaft hub;

wherein the first and second pins allow for relative rotation of the associated first and second blocking rings with respect to the shaft hub to permit the indexing of the associated first and second blocking rings with respect to the associated first and second shift collars.

\* \* \* \* \*